United States Patent [19]

Bederke et al.

[11] Patent Number: 5,430,107
[45] Date of Patent: Jul. 4, 1995

[54] BINDING-AGENT COMPOSITION, COATING AGENT CONTAINING SAID BINDING AGENT, AND THE USE THEREOF

[75] Inventors: Klaus Bederke, Sprockhövel; Hermann Kerber; Walter Schubert, both of Wuppertal; Thomas Brock, Hürth; Helmut Löffler, Brühl, all of Germany

[73] Assignee: Herberts GmbH, Wuppertal, Germany

[21] Appl. No.: 235,269

[22] Filed: Apr. 29, 1994

Related U.S. Application Data

[63] Continuation of Ser. No. 975,032, Nov. 12, 1992, abandoned.

[30] Foreign Application Priority Data

Oct. 1, 1992 [DE] Germany ............ 41 37 613.7

[51] Int. Cl.$^6$ ............................................. C08F 265/04
[52] U.S. Cl. ................................... 525/300; 525/303; 523/415
[58] Field of Search .................. 525/300, 303; 523/415

[56] References Cited

U.S. PATENT DOCUMENTS 4,408,018 10/1983 Bartman et al. ............ 525/300

FOREIGN PATENT DOCUMENTS 3932517A 4/1991 Germany.

OTHER PUBLICATIONS

"Organic Chemistry", Cram and Hammond, 1959, p. 331.

*Primary Examiner*—Melvyn I. Marquis
*Assistant Examiner*—D. Aylward
*Attorney, Agent, or Firm*—Michael O. Warnecke; Richard A. Speer; Keck, Mahin & Cate

[57] ABSTRACT

A binding-agent composition for coating agents which can be cured at low temperature contains:

A. 4–72% by weight of an acidic CH-compound, obtained by transesterification of an aliphatic β-ketocarboxylic acid ester with one or several monomers and/or polymers containing hydroxyl groups and which contain at least two hydroxyl groups in the molecule, B. 4–72% by weight of an α,β-unsaturated compound with at least two groups of the general formula $$R_1R_2C=CR_3-CO-$$

attached via the residue of a divalent or polyvalent alcohol, a diamine or polyamine or amino alcohol to at least one additional $R_1R_2C=CR_3-CO-$group, where $R_1$, $R_2$ and $R_3$ independently of each other are a hydrogen atom or a straight or branched alkyl residue with 1 to 10 carbon atoms, C. 10–80% by weight of one or several polyamines with, by way of curing agents, at least two amine functions, which can be primary and/or secondary and can be blocked, in the molecule, and D. 0.01–5% by weight, relative to the sum of the weights of components A), B) and C), of a catalyst in the form of a Lewis or Brönstedt base, whereby the conjugated acids of the latter have a pKA-value of at least 10.

5 Claims, No Drawings

BINDING-AGENT COMPOSITION, COATING AGENT CONTAINING SAID BINDING AGENT, AND THE USE THEREOF

This is a continuation of application Ser. No. 07/975,032 filed on Nov. 12, 1992, now abandoned, the text of which is hereby incorporated by reference.

FIELD OF THE INVENTION

The invention relates to a two-component binding agent suitable for coating-agent compositions.

BACKGROUND OF THE INVENTION

In DE-A-37 13 511 two-component lacquer binding agents are described based on methacrylic acid-2-acetoacetoxyethyl esters and also their reaction products with aldehydes or ketones and amines. These systems are curable at room temperature, but only very slowly.

In EP-A-0 160 824 two-component lacquers based on reaction products of compounds having acidic CH-groups with olefinically unsaturated compounds are described. These systems harden insufficiently at room temperature and are therefore not suitable, for example, to be used for repair lacquering of automobiles in garages which do not have stoving facilities.

Two-component coating agents curable by heating and based on acidic CH-compounds and compounds having at least two $\alpha,\beta$-unsaturated groups are also described in EP-A-0 224 158. Therein compounds containing methane tricarboxylic acid amide groups are used by way of acidic CH-compounds. These systems also harden insufficiently at room temperature.

In EP-A-0 203 296 an isocyanate-free two-component binding-agent system is described which is based on the reaction of olefinically unsaturated compounds with blocked polyamines. Although this system can be cured at room temperature, resistance to gasoline and hardness of the system are only achieved slowly. Catalysis with Lewis bases is not mentioned.

In DE-A-39 32 517 the crosslinking of acryloyl-unsaturated binding agents with enamine-functionalised crosslinking agents is described. These systems are not really adequate for use as stopper or filler materials, since curing within a few minutes at room temperature is not possible.

SUMMARY OF THE INVENTION

The object of the invention is the provision of a binding-agent composition which is suitable for the production of coating agents which can be rapidly cured at low temperature, e.g. at room temperature, to form films having good hardness as well as resistance to water and solvents.

It has been shown that this task can be solved by means of a binding-agent composition, constituting an object of the invention, containing A. 4–72% by weight of an acidic CH-compound, obtained by transesterification of an aliphatic $\beta$-ketocarboxylic acid ester with one or several monomers and/or polymers containing hydroxyl groups and which contain at least two hydroxyl groups in the molecule, with an OH-number of at least 50 and a number average molecular weight (Mn) of up to 10000, B. 4–72% by weight of an $\alpha,\beta$-unsaturated compound having at least two groups of the general formula $R_1R_2C=CR_3-CO-$ attached via the residue of a divalent or polyvalent alcohol, a diamine or polyamine or amino alcohol to at least one additional $R_1R_2C=CR_3-CO-$ group, where $R_1$, $R_2$ and $R_3$ independently of each other are a hydrogen atom or a straight or branched alkyl residue with 1 to 10 carbon atoms, which can have one or several olefinic unsaturated positions and/or one or several hydroxyl groups, C. 10–80% by weight of one or several polyamines with, as curing agents, at least two primary and/or secondary amine functions, which can be blocked, in the molecule, and D. 0.01–5% by weight, relative to the total weight of components A), B) and C), of a catalyst in the form of a Lewis or Brönstedt base, whereby the conjugated acids of the latter have a pKA-value of at least 10.

The binding agent according to the invention can contain organic solvents and/or water, by way of organic solvents for example residual solvents present from manufacture or as a result of subsequent addition with a view to setting viscosities which are advantageous for use. Such solvents can, for example, be those named below for producing the coating agents.

Preferably, however, the presence of an organic solvent or, optionally, water is dispensed with, the aim being to make use of a largely solvent-free binding agent in order to avoid very disrupting shrinkage of the film, particularly when using the binding agent as stopper.

DETAILED DESCRIPTION OF THE PREFERRED EMBODIMENTS

The acidic CH component A according to the invention can be produced by transesterification of an aliphatic $\beta$-ketocarboxylic acid ester with a polyol.

Suitable $\beta$-ketocarboxylic acid esters are, for example, esters of acetoacetic acid or alkyl-substituted acetoacetic acids, such as $\alpha$- and/or $\gamma$-methyl acetoacetic acid. Suitable esters of these acids are those with aliphatic alcohols, preferably lower alcohols with 1 to 4 carbon atoms, such as methanol, ethanol or butanol.

According to a preferred embodiment of the invention, suitable as polyols for reacting with the $\beta$-ketocarboxylic acid esters are monomers and polymers chosen from:

a) polyols from the group of straight or branched alkane diols and alkane polyols having 2 to 12 carbon atoms, b) poly(meth)acrylates or poly(meth)acrylic amides containing hydroxyl groups and based on (meth)acrylic acid hydroxyalkyl esters or (meth)acrylic acid hydroxyalkyl amides each with 2 to 12 carbon atoms in the alkyl part, optionally copolymerised with $\alpha,\beta$-unsaturated monomers, with a number average molecular weight (Mn) of 1000 to 10000, c) poly(meth)acrylates containing hydroxyl groups and based on (meth)acrylic acid hydroxyalkyl esters with 2 to 12 carbon atoms in the alkyl part and optionally copolymerisable $\alpha,\beta$-unsaturated monomers, which are modified with cyclic esters of hydroxycarboxylic acids having 4 to 6 carbon atoms, with a number average molecular weight (Mn) of 1000 to 10000, and d) polyester polyols or polyether polyols each having a number average molecular weight (Mn) of 500 to 2000.

Suitable alkane diols and alkane polyols of group a) are those having straight and branched chains with 2-12 carbon atoms. They contain at least two hydroxy functions but preferably at least three. Examples are propane diol, butane diol, hexane diol, glycerine, trimethylolpropane and pentaerythritol.

Examples of poly(meth)acrylates b) containing hydroxyl groups and based on (meth)acrylic acid hydroxyalkyl esters with 2 to 12 carbon atoms in the alkyl part are hydroxylalkyl esters of acrylic acid or methacrylic acid with alcohols having at least two hydroxyl groups, such as 1,4-butane diol mono(meth)acrylate, 1,6-hexane diol mono(meth)acrylate or 1,2,3-propane triol mono(meth)acrylate. Examples of poly(meth)acrylic amides b) containing hydroxyl groups and based on (meth) acrylic acid hydroxyalkyl amides are amides of acrylic acid or methacrylic acid with hydroxyalkyl amines or di(hydroxyalkyl) amines each with 2 to 12 carbon atoms in the alkyl part, which can have one or several hydroxyl groups, such as acrylic acid hydroxyethyl amide. The term (meth)acrylic used in the present description and in the Claims should be taken to denote acrylic and/or methacrylic.

The poly(meth)acrylates of component b) containing hydroxyl groups can be homopolymers or copolymers. They have a number average molecular weight of 1000 to 10000, preferably of 3000 to 6000. Copolymerisable monomers for producing the copolymers are α,β-unsaturated monomers, monomers from the group of esters of α,β-unsaturated carboxylic acids which are capable of radical polymerisation, such as acrylic acid or methacrylic acid, whereby examples of the alcohol components of the esters are methyl alcohol, ethyl alcohol, propyl alcohol and their isomers and higher homologues. Additional examples are diesters of maleic or fumaric acid, whereby the alcohol component is the same as that stated above. Further examples are vinyl-aromatic compounds such as styrene, α-methyl styrene and vinyl toluene. Further examples are vinyl esters of short-chain carboxylic acids such as vinyl acetate, vinyl propionate and vinyl butyrate.

The poly(meth)acrylates containing hydroxyl groups of component c) defined above can be modified poly(meth) acrylate homopolymers and copolymers, such as are described under b), the hydroxyl groups of which are reacted wholly or in part with cyclic esters, for example of hydroxycarboxylic acids having 4 to 6 carbon atoms, such as butyrolactone or caprolactone. The modified poly(meth) acrylates of component c) obtained have a number average molecular weight Mn of 1000 to 10000.

Examples of the polyester polyols and polyether polyols of component d) are those with a number average molecular weight Mn of 500 to 2000. Particular examples are reaction products of di- or tricarboxylic acids, such as adipic acid or trimellitic acid, with polyols, whereby the polyols are present in excess. Further examples are reaction products of diols or triols, such as propane diol, butane diol or glycerine, with ethylene oxide or propylene oxide. Synthesis of the acidic C—H component can, for example, be effected in several stages. After removal of optionally present solvents the polyol is first transesterified with the aliphatic β-ketocarboxylic acid ester.

In the process of transesterification of the polyol a procedure which can be followed, for example, is that the polyol, optionally liberated from the solvent by application of a vacuum, is submitted. The β-ketocarboxylic acid ester is now added in excess, for example dropwise. Reaction is effected at high temperature; the alcohol released is removed from the system.

In order to speed up the reaction it is possible to add a catalyst. Examples of such catalysts are acids such as formic acid or p-toluene sulfonic acid. It is advantageous during transesterification to raise the reaction temperature continuously (for example, in steps of 10° C./20 min) until a temperature is reached which is a little (about 10° C.) below the boiling-point of the β-ketocarboxylic acid ester. After quantitative transesterification the excess β-ketocarboxylic acid ester is removed, for example by applying a vacuum. Then the mixture can be cooled and adjusted with the aid of an inert solvent to give a desired solids content.

With a view to adjusting their viscosity, the binding-agent compositions according to the invention can also contain 2-acetoacetoxyethyl methacrylate as reactive diluent.

By way of additional binding-agent component B) in the binding-agent compositions according to the invention a compound is used which has at least two unsaturated functional groups of the general formula (I) $R_1R_2C=CR_3$—CO—, in which $R_1$, $R_2$ and $R_3$ independently of each other are a hydrogen atom or a straight or branched alkyl residue with 1 to 10 carbon atoms which can have one or several olefinic unsaturated positions and/or one or several hydroxyl groups. These groups can be linked with one another via short-chain or long-chain residues, oligomers and/or polymers of divalent or polyvalent alcohols, diamines or polyamines or amino alcohols, whereby these oligomers and polymers can have, e.g., a number average molecular weight Mn from 1000 to 10000. By way of oligomers and polymers, saturated and/or unsaturated polyethers, polyesters or polyurethanes containing two or more hydroxyl groups can for example be used, e.g. those based on maleic acid, phthalic acid and diols, acrylic resins containing hydroxyl groups, aliphatic or, preferably, aromatic epoxide resins, optionally containing hydroxyl groups, e.g. those based on diphenylol propane and/or diphenylol methane, hydantoin and/or amine resins. The residue of the general formula (I) can at the same time be linked in the form of an ester, e.g. by the addition of acrylic or methacrylic acid or their derivatives to epoxy groups of epoxide resin, or by esterification onto hydroxyl groups of polyols. Suitable polyvalent alcohols are, for example, alkane diols and triols with 2 to 8 carbon atoms, such as ethane diol, the various propane, butane, hexane, and octane diols or their homologues, the corresponding oligomeric ethers, also glycerine, trimethylolethane or trimethylolpropane, hexane triol, pentaerythritol, dipentaerythritol, sorbitol, and also polyvinyl alcohol.

The groups of the general formula (I) can also be attached via NH groups and/or OH groups to polyamines having at least two NH groups or at least one NH group and at least one OH group. By way of parent compounds containing NH groups for such compounds, diamines and polyamines can, for example, be mentioned, such as alkylene diamines and their oligomers, such as ethylenediamine, propylenediamine, diethylenetriamine, tetramines and higher homologues of these amines, as well as amino alcohols such as diethanol amine or the like. By way of amines, aminocarboxylic acid esters of polyvalent alcohols, for example, can also be used. By way of compound with NH groups, acrylic or methacrylic acid polyamides can be used, and also polyurethanes, e.g. polyisocyanates which are blocked in the form of polyurethane groups, such as those which are obtained by reacting hydroxyethyl acrylate with polyisocyanates, amine resins such as methoxy melamines, preferably hexamethylol melamine, carbamide resins, whereby the residue of the general formula (I) with the —CO— grouping is bonded as amide to the amine groups of these compounds. In case these amide compounds have OH groups or hydroxyalkyl groups it is also possible that the residue of the formula (I) is attached to these compounds in the form of an ester or via an ether group. For the ether bond of the residue of the formula (I) it is possible to start with a hydroxyalkyl ester or a hydroxyalkyl amide of an unsaturated acid such as acrylic acid.

The residue of the general formula (I) in component B) can be derived from a singly or multiply unsaturated monocarboxylic acid, e.g. with 2 to 10, preferably 3 to 6 carbon atoms, such as cinnamic acid, crotonic acid, citraconic acid, mesaconic acid, dihydrolevulic acid, sorbic acid and, preferably, acrylic acid and/or methacrylic acid.

Likewise it is possible to use adducts of copolymers of the compound α-dimethyl-m-isopropenylbenzylisocyanate (always referred to hereinafter as m-TMI) and hydroxy(meth)acrylic monomers. The comonomers which can be used with m-TMI with a view to producing the copolymers are, e.g., conventional esters of (meth)acrylic acid, such as those stated above in connection with the polyols. Examples of hydroxy(meth)acrylic monomers for forming adducts are hydroxyethyl (meth) acrylate, hydroxypropyl (meth)acrylate or butane diol monoacrylate. Equally possible is the use of addition products of hydroxyethyl methacrylate on caprolactone.

The component B) can be free of solvents or contain residual solvents from its production, e.g. aliphatic and/or aromatic hydrocarbons. The solids content can be adjusted to desired values, e.g. by removing the residual solvent, for example by distillation or by addition of water or solvents which are needed for the subsequent preparation of coating agents and which are described below. Preferably used is the same solvent as used for component A).

The component C) in the binding-agent composition is a polyamine component with at least two functional groups of the formula

where $R^4$ can be a hydrogen atom or a straight or branched alkyl residue with 1 to 10 carbon atoms or cycloalkyl residue with 3 to 8, preferably 6 carbon atoms.

Suitable polyamines are diamines and amines with more than two amino groups, whereby the amino groups can be primary or secondary. Also suitable as polyamines are, for example, adducts which consist of polyamines with at least two primary amino groups and at least one, preferably one, secondary amino group, with epoxy compounds, polyisocyanates and acryloyl compounds. Also suitable are amino amides and adducts of carboxyl-functionalised acrylates with imines having at least two amino groups.

Examples of suitable diamines and polyamines are described, for example, in EP-A-0 240 083 and EP-A-0 346 982. Such examples are aliphatic and/or cycloaliphatic amines with 2-24 C atoms, which contain 2-10 primary amino groups, preferably 2-4 primary amino groups, and 0-4 secondary amino groups. Representative examples of these are ethylenediamine, propylenediamine, butylenediamine, pentamethylenediamine, hexamethylenediamine, 4,7-dioxadecane-1,10-diamine, 1,2-diaminocyclohexane, 1,4-diaminocyclohexane, isophoronediamine, diethylenetriamine, dipropylenetriamine, 2,2-bis-(4-aminocyclohexyl)propane; polyether polyamines, e.g. those with the trade name Jeffamine (made by the Jefferson Chemical Company), bis-(3-aminopropyl)ethyl amine, 3-amino-1-(methylamino)propane and 3-amino-1-(cyclohexylamino)propane.

Examples of common polyamines based on adducts of polyfunctional amine components with di- or polyfunctional epoxy compounds are those which are produced using, for example, di- or polyfunctional epoxy compounds such as diglycidyl or polyglycidyl ethers of (cyclo)aliphatic or aromatic hydroxy compounds such as ethylene glycol, glycerol, 1,2- and 1,4-cyclohexane diol, bisphenols such as Bisphenol A, polyglycidyl ethers of phenol formaldehyde novolaks, polymers of ethylenically unsaturated groups which contain epoxy groups such as glycidyl (meth)acrylate, n-glycidyl (meth)acrylic amide, and/or allyl glycidyl ether, alternatively copolymerised with various other ethylenically unsaturated monomers, glycidyl ethers of fatty acids with 6-24 C atoms, epoxidised polyalkadienes such as epoxidised polybutadiene, hydantoin epoxy resins, resins containing glycidyl groups such as polyesters or polyurethanes which contain one or several glycidyl groups per molecule, and mixtures of the named resins and compounds.

Addition of the polyamines to the named epoxy compounds takes place after the ring of the oxirane grouping has been opened. The reaction can, for example, take place in a temperature range from 20°-100° C., but preferably between 20° and 60° C. Catalysis can optionally be effected with 0.1 to 2% by weight of a Lewis base such as triethyl amine or an ammonium salt such as tetrabutyl ammonium iodide.

Common isocyanates for the production of the polyamine component based on polyamine-isocyanate adducts are aliphatic, cycloaliphatic and/or aromatic di-, tri- or tetraisocyanates which can be ethylenically unsaturated. Examples are 1,2-propylene diisocyanate, trimethylene diisocyanate, tetramethylene diisocyanate, 2,3-butylene diisocyanate, hexamethylene diisocyanate, 2,2,4-trimethylhexamethylene diisocyanate, 2,4,4-trimethylhexamethylene diisocyanate, ω,ω'-dipropylether diisocyanate, 1,3-cyclopentane diisocyanate, 1,2- and 1,4-cyclohexane diisocyanate, isophorone diisocyanate, 4-methyl-1,3-diisocyanate cyclohexane, transvinylidene diisocyanate, dicyclohexylmethane-4,4'-diisocyanate, 3,3'-dimethyl-dicyclohexylmethane-4,4'-diisocyanate, toluidene diisocyanate, 1,3-bis(1-isocyanato-1-methylethyl)benzene, 1,4-bis(1-isocyanato-1-methylethyl)benzene, 4,4'-diisocyanatodiphenyl, 3,3'-dichloro-4,4'-diisocyanatodiphenyl, adducts consisting of 2 moles of a diisocyanate, e.g. hexamethylene diisocyanate or isophorone diisocyanate on one mole of a diol, e.g. ethylene glycol, the adduct of 3 moles hexamethylene diisocyanate on 1 mole water (available under the trade name Desmodur N from Bayer AG), the adduct of 1 mole trimethylolpropane and 3 moles toluidene diisocyanate (available under the trade name Desmodur L from Bayer AG) and the adduct of 1 mole trimethylolpropane and 3 moles isophorone diisocyanate.

Addition of polyamines to the named isocyanate compounds is effected, for example, in a temperature range of 20°–80° C., preferably 20°–60° C. Catalysis can optionally be effected by the addition of 0.1 to 1% by weight of a tertiary amine such as triethylene amine and/or 0.1 to 1% by weight of a Lewis acid such as dibutyl tin laurate.

Examples of di- or polyfunctional acryloyl-unsaturated compounds for producing polyamine adducts are described in U.S. Pat. No. 4,303,563, e.g. ethylene glycol diacrylate, diethylene glycol diacrylate, trimethylene glycol diacrylate, 1,3-butylene glycol diacrylate, 1,6-hexamethylene glycol diacrylate, trimethylolpropane diacrylate, pentaerythritol tetraacrylate and pentaerythritol triacrylate. Further examples of polyfunctional acryloyl-unsaturated acrylates are:

1) urethane acrylates, obtained by the reaction of an isocyanate group of a polyisocyanate with a hydroxy acrylate, e.g. hexamethylene diisocyanate and hydroxyethyl acrylate; the production process is described in U.S. Pat. No. 3,297,745,
2) polyether acrylates, obtained by transesterification of a hydroxy-terminated polyether with acrylic acid, described in U.S. Pat. No. 3,380,831,
3) polyester acrylate, obtained by esterification of a polyester containing hydroxyl groups with acrylic acid, described in U.S. Pat. No. 3,935,173,
4) polyfunctional acrylates, obtained by the reaction of a hydroxyl-functionalised acrylate, such as hydroxyethyl acrylate with
   a) dicarboxylic acids having 4–15 C atoms,
   b) polyepoxides with terminal glycidyl groups,
   c) polyisocyanates with terminal isocyanate groups, described in U.S. Pat. No. 3,560,237,
5) acrylate-terminated polyesters, obtained by the reaction of acrylic acid, a polyol with at least three hydroxy functions and a dicarboxylic acid, described in U.S. Pat. No. 3,567,494,
6) polyacrylate, obtained by the reaction of acrylic acid with an epoxidised oil containing epoxide functions, such as soybean oil or linseed oil, described in U.S. Pat. No. 3,125,592,
7) polyacrylate, obtained by the reaction of acrylic acid with epoxide groups of a diglycidyl ether of Bisphenol A, described in U.S. Pat. No. 3,373,075,
8) polyacrylate, obtained by the reaction of acrylic acid on an epoxide-functionalised vinyl polymer, e.g. polymers with glycidyl acrylate or vinyl glycidyl ether, described in U.S. Pat. No. 3,530,100,
9) polyacrylate, obtained by the reaction of acrylic acid anhydride with polyepoxides, described in U.S. Pat. No. 3,676,398,
10) acrylate-urethane ester, obtained by the reaction of a hydroxyalkyl acrylate with a diisocyanate and a hydroxyl-functionalised alkyde resin, described in U.S. Pat. No. 3,676,140,
11) acrylate-urethane polyester, obtained by the reaction of a polycaprolactone diol or polycaprolactone triol with an organic polyisocyanate and a hydroxyalkyl acrylate, described in U.S. Pat. 3,700,634,
12) urethane polyacrylate, obtained by the reaction of a hydroxy-functionalised polyester with acrylic acid and a polyisocyanate, described in U.S. Pat. No. 3,759,809.

The acryloyl terminal groups of the di- or polyacrylic monomers or the polyacrylates from Examples 1) to 12) can be functionalised with polyamines. Addition can be effected, e.g., in a temperature range from 20°–100° C. preferably at 40°–60° C.

A further method for synthesising an amine-functionalised curing agent is described in EP-A-2801. By this method acrylic acid ester copolymers are amidised with diamines, alcohol being split off. The reactive group thereby obtained has the following structure:

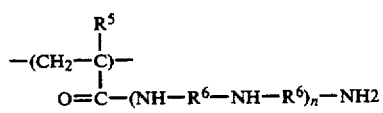

$R^5$ = H or $CH_3$
$R^6$ = alkyl groups with 2 or 3 C atoms, which can be the same or different
n = 0, 1, 2 or 3
whereby the residue

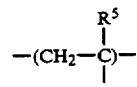

is derived from the acrylic acid ester copolymer skeleton.

The acrylic acid ester copolymer has a number average molecular weight Mn of 1000–20000, preferably 2000–5000. Examples of possible comonomers are esters of (meth)acrylic acid such as methyl (meth)acrylate, ethyl (meth) acrylate, butyl (meth)acrylate, cyclohexyl (meth)acrylate, hydroxyethyl (meth)acrylate, hydroxypropyl (meth)acrylate, and also (meth)acrylic acid, styrene and vinyl toluene.

Particularly preferred is methyl acrylate, since this monomer is particularly easy to aminolyse. The proportion of methacrylate on the copolymer amounts to 2–35% by weight. Production of the copolymer is effected by solution polymerisation in conventional solvents such as toluene, xylenes, acetates, e.g. butyl acetate or ethyl glycol acetate, ethers such as tetrahydrofuran or mixtures of aromatics such as the commercial product Solvesso 100. The synthesis of the copolymers is familiar to one skilled in the art and requires no further elucidation. The polyamines which are used for aminolysis must contain at least two primary or secondary amine groups and have already been described.

Equally useable as curing agents are reaction products from the reaction of a (meth)acrylic acid copolymer with alkylene imines such as are described in EP-A-0 179 954. The functional groups obtained have the structure:

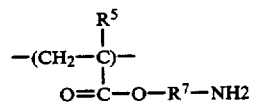

$R_5$ = H or $CH_3$
$R^7$ = alkylene group with 2 to 4 C atoms
whereby the residue

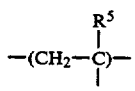

defined as above.

In addition to (meth)acrylic acid the copolymer can contain esters of (meth)acrylic acid or vinyl compounds such as styrene. The useable comonomers have, for example, already been described in the definition of the poly(meth) acrylates b) containing hydroxyl groups. Examples of alkylene imines are propylene imine or butylene imine.

Examples of polyamines equally useable as curing agents according to the invention are also those which are produced by reaction of copolymers of α-dimethyl-m-isopropenylbenzyl isocyanate, which have a number average molecular weight (Mn) of 1000 to 10000, with mono- or diketimines which contain either an OH or a sec. NH grouping.

By way of comonomers for producing the TMI copolymers all conventional monomers capable of vinyl polymerisation without OH functionality can be used, for example esters of (meth)acrylic acid such as methyl, ethyl, butyl, isobutyl, ethylhexyl, cyclohexyl and/or lauryl (meth)acrylate, and also styrene, vinyl toluene and/or vinyl methyl styrene. Production of the copolymers is effected by conventional radical solution polymerisation, familiar to one skilled in the art. Aprotic organic solvents may, for example, be used, e.g. toluene and xylene, and esters, e.g. butyl acetate.

Generally used to this end are conventional radical initiators such as peroxides and azo-compounds. Reaction is effected, e.g., subject to heating, for example to temperatures from 80° to 140° C.

The monomeric TMI can be copolymerised within the range from 3 to 40% by weight, relative to the total weight of all monomers, but preferably within the range from 5 to 25% by weight.

The isocyanate-terminated copolymer is then reacted with one or several mono- and/or diketimines functionalised with OH or sec. NH and/or mono- and/or dialdimines.

Production of the ketimines and/or aldimines (for simplicity hereinafter the term 'ketimines' is used, which, however, should also be taken to include aldimines) is effected, e.g., by reaction of alkanol amines or di- or triamines which have at least one primary amino group, and in the case of di- or triamines which additionally contain a secondary amine function, with aldehydes and/or ketones, water being split off.

Examples of alkanol amines are:

monoethanol amine, monopropanol amine, monohexanol amine or 2-amino-2-hydroxy propane.

Examples of di- or triamines which have at least one primary amino group and a secondary amino group, are:

n-methylpropyl amine, diethylenetriamine, dipropylenetriamine or bishexamethyltriamine.

In order to produce the TMI-acrylate/ketimine adducts the primary amino groups of the amines named above must be blocked.

In this connection the primary amines are reacted with aldehydes or ketones, whereby water is split off, so as to form Schiff's bases or, respectively, aldimines or ketimines. Examples of such aldehydes and ketones are: $C_3-C_{10}$-compounds, such as hexyl aldehyde, octyl aldehyde, diisopropyl ketone and/or methyl isobutyl ketone. The two latter compounds are particularly preferred, since they only exhibit a slight tendency towards side reactions.

In the process of addition to the isocyanate-terminated copolymer the OH- or sec.-NH-functionalised mono- or diketimines are preferably used in less than the usual quantity, preferably 90–95% of the isocyanate groups are reacted with OH or NH groups. The remaining excess isocyanate groups are urethanised in a final reaction stage with monoalcohols such as ethanol, propanol or butanol.

In order to synthesise the ketimine- or aldimine-functionalised (blocked) polyamines, a TMI copolymer, for example, is first produced by radical solution polymerisation. Then an alkanol amine or di- or triketimine, which has at least one primary and also a secondary amine function, is produced with the desired blocking agent aldehyde or ketone in an organic solvent which forms an azeotropic mixture with water. By heating this mixture the reaction water arising is distilled off azeotropically.

It is advantageous to carry out production in an atmosphere of inert gas. The blocking agent can be used in excess, which subsequent to the reaction can be distilled off. It is advisable to choose by way of blocking agent a ketone/aldehyde which itself forms an azeotrope with water, so that no additional organic solvent is needed. With a view to adding the OH- or sec.-NH-functionalised ketimine or aldimine to the isocyanate-terminated copolymer the ketimine is introduced at, e.g., 80° C. in an atmosphere of inert gas and the copolymer is added in doses within, e.g., a period of two hours. The reaction can optionally be catalysed with the aid of a Lewis acid such as dibutyl tin laurate. After charging is complete, provided that there is a deficiency of ketimine, an alcohol, e.g. butanol, is added. Stirring is optionally effected at still higher temperature for, e.g., about 10 to 30 min.

The above-stated production method represents merely one example of a particular processing mode. In another method, for example, the copolymer can be introduced and the ketimine added.

The terminated (free) amino groups of the polyamine curing-agent component C can be blocked, e.g. with ketones or aldehydes, subject to the formation of Schiff's bases.

All the polyamines previously described exhibit very high reactivity with the binding-agent components according to the invention, this being manifested in a very short pot-life. For this reason it can be expedient to convert the terminated amine groups of the named polyamines with aldehydes or ketones, whereby water is split off, so as to form Schiff's bases or, respectively, aldimines or ketimines. Examples of aldehydes and ketones which can be used for blocking are $C_3-C_{10}$-compounds, such as hexyl aldehyde, octyl aldehyde, diisopropyl ketone and/or methyl isobutyl ketone. The two latter compounds are particularly preferred, since they exhibit only a slight tendency towards side reactions.

Component C contains catalysts in the form of Lewis bases or Brönstedt bases and mixed in as component D, whereby the conjugated acids of the latter have a pKA-value of at least 10. Component D can consist of one or several catalysts. Lewis bases have proved particularly suitable, e.g. those of the group of cycloaliphatic amines, such as diazabicyclooctane (DABCO), tert.-aliphatic amines such as triethyl amine, tripropyl amine, n-methyldiethanol amine, n-methyldiisopropyl amine or n-butyldiethanol amine, as well as amidines such as diazabicycloundecene (DBU), and guanidines such as n,n,n',n'-tetramethyl guanidine Further examples are alkyl- or aryl-substituted phosphanes such as tributyl phosphane, triphenyl phosphane, tris-p-tolyl phosphane, methyldiphenyl phosphane, as well as hydroxy- and amine-functionalised phosphanes such as trishydroxymethyl phosphane and tris-dimethylaminoethyl phosphane.

Examples of useable Brönstedt bases are alcoholates such as sodium or potassium ethylate, quaternary ammonium compounds such as alkyl, aryl or benzyl ammonium hydroxides or halogenides such as tetraethyl or tetrabutyl ammonium hydroxide or fluoride, as well as trialkyl or triaryl phosphonium salts or hydroxides.

The quantity of catalysts generally amounts to 0.01 to 5% by weight, preferably 0.02 to 2% by weight, relative to the total solids content of the components A, B and C.

The binding-agent compositions according to the invention are so-called two-component systems.

The components A and B are stored together as binding-agent component 1 and the components C and D are stored together as curing-agent component 2.

This means that components 1 and 2 are stored separately and are mixed only prior to application or with a view to application, for example in order to manufacture coating agents. The binding-agent compositions according to the invention can be formulated in the conventional way into coating agents, for example, fillers. This is generally effected by the addition of solvents or water. At the same time it is possible to prepare a mixture of components 1 and 2 and to process this in conventional manner into coating agents by the addition of solvents or water and conventional additives. It is also possible, however, firstly to prepare one of the components 1 or 2 by the addition of solvents or water and conventional additives and then to add the other component.

Suitable organic solvents for producing coating agents, for example lacquers, are those which can also be used in the production of the individual components A, B and C. Examples of such solvents are organic solvents such as aliphatic and aromatic hydrocarbons, for example toluene, xylene, mixtures of aliphatic and/or aromatic hydrocarbons, esters, ethers and alcohols. These are conventional lacquer solvents. With a view to producing the coating agents from the binding agents according to the invention aqueous solutions can also be prepared. Suitable emulsifiers such as are customary in the lacquering industry can optionally be used for this purpose.

With a view to producing the coating agents, conventional additives such as are, for example, customary in the lacquering industry can be added. Examples of such additives are pigments, for example transparent or opaque colour-producing pigments such as titanium dioxide or carbon black, and effect-creating pigments such as metal-flake pigments and/or pearly-sheen pigments.

The binding-agent compositions according to the invention are particularly well suited for coating agents which contain effect-creating pigments of these kinds. They preferably contain effect-creating pigments together with transparent colour-creating pigments or opaque colour-creating pigments together with filler materials.

Further examples of additives are filler materials, such as talc and silicates; emollients, light-absorbing agents, stabilisers and levelling agents such as silicon oils.

The coating agents produced from the binding agents according to the invention can be set to the desired application viscosity by suitable regulation of the addition of solvent and/or additives.

The coating agents can, according to the proportion of component 1 to component 2, equivalent weight and amount of catalyst, be adjusted to have pot-life times ranging from, for example, a few seconds to one hour.

Application of the coating agents so produced can be effected in conventional manner, for example by dipping, spraying, brushing or by electrostatic means.

Curing of the coatings produced from the coating agents can be effected in a wide temperature range, for example from $-10°$ C. to $200°$ C. The preferred temperature range is from $20°$ C. to $80°$ C., for example room temperature.

The coating agents produced from the binding agents according to the invention are suitable for coatings which adhere to a plurality of substrates, such as wood, textiles, plastic, glass, ceramics and, in particular, metal. The coating agents can also be used in a multi-layer process. To this end they can, for example, be applied to conventional primers, basecoat lacquers, fillers or to existing surface lacquers.

A particularly preferred area of application for the binding agents according to the invention is the provision of coating agents for lacquer coatings in the automobile industry. By virtue of the advantageous curing conditions of the coating agents produced from the binding agents according to the invention these agents are particularly suitable for repair lacquering of automobiles.

The present invention consequently also relates to processes for producing coatings on various substrates, in which processes a coating agent produced from the binding agents according to the invention is applied to the substrate, whereupon drying and curing is carried out. The invention also relates to the use of the binding-agent compositions according to the invention in stoppers, fillers or surface lacquers.

With the coating agents produced from the binding agents according to the invention films are obtained which have in every case goodhardness and good resistance to water and solvents, particularly gasoline. Curing is effected very rapidly; thorough curing can, for example, be achieved within a few minutes, roughly 5 minutes, at room temperature.

The following Examples serve to elucidate the invention. All parts and percentages stated relate to weight.

EXAMPLES

1) Production of an acetate-functionalised polyester ( component A )

a) Production of the polyester 1a

In a 2-liter three-necked flask equipped with stirrer, separator, thermometer and reflux condenser, 336.7 parts of trimethylolpropane, 366.8 parts of adipic acid and 297 parts of hexane diol are mixed with 5 parts of hypophosphorous acid. The mixture is slowly heated in a melt from $180°$ C. up to $230°$ C., water being separated off in the process The reaction is continued until an acid number of 20 mg KOH/g is obtained. Then condensation is effected subject to a water-jet vacuum until an acid number of less than 1.5 mg KOH/g is obtained. The resulting polyester then has an OH-number of 466 mg KOH/g and a viscosity of 3200 mPa.s.

b) Production of the polyester 1b

In a 4-liter three-necked flask equipped with stirrer, separator, thermometer and reflux condenser, 586.8 parts of trimethylolpropane, 227.7 parts of neopentyl glycol, 499.3 parts of Bisphenol A and 363.5 parts of isophthalic acid are mixed with 3 parts of hypophosphorous acid. The mixture is slowly heated to 220° C. and, in a melt with water being separated, maintained at this temperature until the clear point is reached. Then 319.7 parts of adipic acid are added at 100° C. and the mixture is again slowly heated to 240° C. The reaction is continued until an acid number of about 1.8 mg KOH/g is attained. The resin obtained is solid when cold and then has an OH-number of 401 mg KOH/g.

c) Production of an acetate-functionalised polyester based on the polyester 1a

In a 4-liter three-necked flask equipped with stirrer, drip funnel, separator and reflux condenser, 1000 parts of the polyester produced under 1a) are introduced. To this resin 850 parts of acetoacetic ester and 1.5 parts of 98% formic acid are added and heated to 130° C. whereby ethanol is separated off. The resin is further heated to 165° C. until altogether 400 parts of distillate have been separated. Subsequently all volatile components are removed in a vacuum. The 98.1% resin obtained then has a viscosity of 3100 mPa.s. and a colour number of 65 haze.

d) Production of an acetate-functionalised polyester based on the polyester 1b

In a 4-liter three-necked flask equipped with stirrer, drip funnel, separator and reflux condenser, 1650 parts of the polyester 1b, 1232 parts of acetoacetic ester and 2.5 parts of 98% formic acid are introduced and heated to 132° C., whereby ethanol is separated off. The resin is further heated to 175° C. until altogether 304 parts of distillate have been separated.

Subsequently all volatile components are removed in a vacuum. The 97.6% resin obtained then has a viscosity of 4150 mPa.s.

2) Polyacrylate:
trimethylolpropane triacrylate (component B)

3) Polyamine component (component C)
Commercial cycloaliphatic amine, amine number 235 to 295 mg KOH/g, viscosity 250 to 500 mPa.s. (adduct of Bisphenol A and isophorone diamine).

4) Catalyst:
diazabicyclo(4.5.0)undecene (component D)

5) Production of stoppers:
a) Production of a stopper based on the acetate-functionalised polyester 1c
I. The following components (A+B) are mixed with one another:
18.3 parts of the acetate-functionalised polyester 1c
16.5 parts of trimethylolpropane triacrylate
2.6 parts of 2-acetoxyethyl methacrylate
0.6 parts of pyrogenic silicon dioxide (Aerosil R 972)
3.0 parts of titanium dioxide pigment (Titan RKB 2)
4.8 parts of talc (Mikrotalkum AT 1)
11.0 parts of heavy spar
37.4 parts of talc (Fintalc M 40)
II. By way of curing component (C+D) a mixture is made of:

4.6 parts of a commercial adduct of Bisphenol A with isophorone diamine
0.6 parts of diazabicycloundecene (DBU)
The two mixed components I. and II. are then mixed thoroughly with one another.
The mixture was gelled after 90 sec and was solid after 150 sec.

b) Production of a stopper based on the acetate-functionalised polyester 1d

The process described in 5a) is followed, whereby instead of 18.3 parts of the polyester 1c, the same quantity of polyester 1d is used.

After it had been mixed, the mass was gelled after 120 sec and solid after 240 sec.

Application

After application onto glass plates with a film thickness of about 100 μm both the stoppers 5a) and 5b) are solid within 10 min and are capable of being ground after the curing-time.

What is claimed is:

1. Binding-agent composition, containing
A. 4–72% by weight of an acidic CH-compound, obtained by transesterification of an aliphatic β-ketocarboxylic acid ester with one or several monomers and/or polymers containing hydroxyl groups and which contain at least two hydroxyl groups in the molecule, with an OH-number of at least 50 and a number average molecular weight (Mn) of up to 10000,
B. 4–72% by weight of an α,β-unsaturated compound with at least two groups of the general formula $R_1R_2C=CR_3—CO—$ attached via the residue of a divalent or polyvalent alcohol, a diamine or polyamine or amino alcohol to at least one additional $R_1R_2C=CR_3—CO—$ group, where $R_1$, $R_2$ and $R_3$ independently of each other are a hydrogen atom or a straight or branched alkyl residue with 1 to 10 carbon atoms which can have one or several olefinic unsaturated positions and/or one or several hydroxyl groups,
C. 10–80% by weight of one or several polyamines with, by way of curing agents, at least two amine functions, which are primary and/or secondary and can be blocked, in the molecule and
D. 0.01–5% by weight relative to the total weight of components A), B) and C), of a catalyst in the form of a Lewis or Brönstedt base, whereby the conjugated acids of the latter have a pKA-value of at least 10.

2. Binding-agent composition according to claim 1, characterised in that the monomer containing hydroxyl groups and the polymer containing hydroxyl groups of component A) are Chosen from
a) polyols from the group of straight or branched alkane diols and alkane polyols having 2 to 12 carbon atoms,
b) poly(meth)acrylates or poly(meth)acrylic amides containing hydroxyl groups and based on (meth)acrylic acid hydroxyalkyl esters or (meth)acrylic acid hydroxyalkyl amides with, in each case, 2 to 12 carbon atoms in the alkyl part, optionally copolymerised with α,β-unsaturated monomers, with a number average molecular weight (Mn) of 1000 to 10000, c) poly(meth)acrylates containing hydroxyl groups and based on (meth)acrylic acid hydroxyalkyl esters having 2 to 12 carbon atoms in the alkyl part and optionally copolymerisable α,β-unsaturated monomers which are modified with cyclic esters of hydroxycarboxylic acids having 4 to 6 carbon atoms, with a number average molecular weight (Mn) of 1000 to 10000, and d) polyester polyols or polyether polyols each having a number average molecular weight (Mn) of 500 to 2000.

3. Binding-agent composition according to either of claims 1 or 2, characterised in that it is present in solvent-free form.

4. Binding-agent composition according to either of claims 1 or 2, characterised in that it is present in solvent-containing form.

5. Coating agent, containing the binding-agent composition according to any of claims 1 to 2 and, in addition, one or several organic solvents and/or water, as well as pigments and/or filler materials.

* * * * *